March 28, 1944. P. H. BRACE 2,345,090
MERCURY DETECTING METHOD AND APPARATUS
Filed April 10, 1940 2 Sheets-Sheet 2
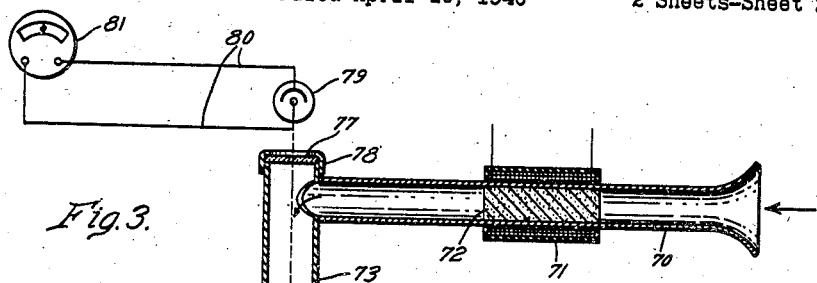
Fig. 3.
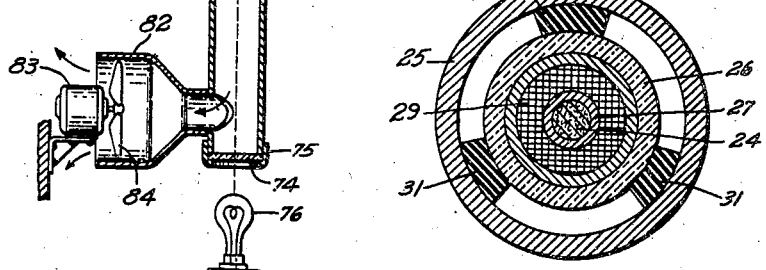
Fig. 2.
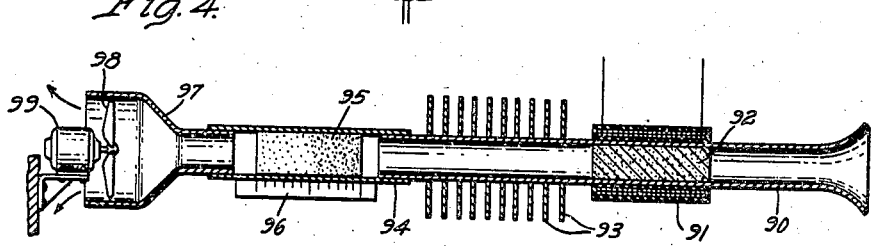
Fig. 4.
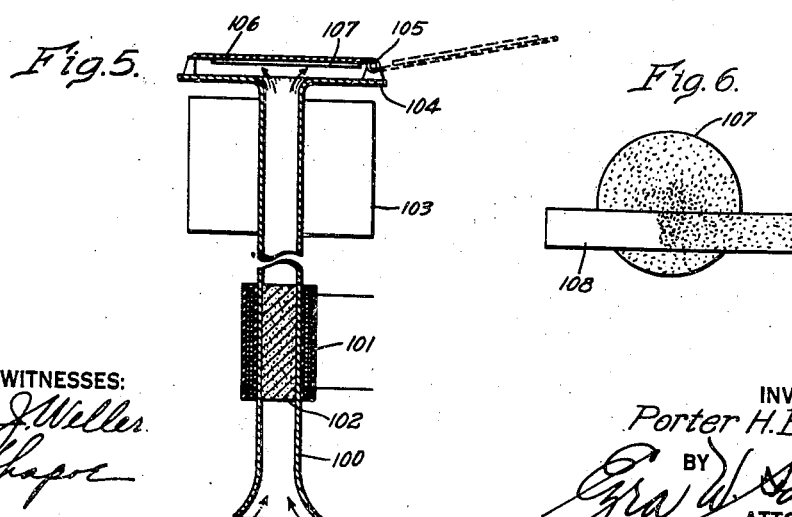
Fig. 5.
Fig. 6.
WITNESSES:
INVENTOR
Porter H. Brace.
BY
ATTORNEY Patented Mar. 28, 1944

2,345,090

UNITED STATES PATENT OFFICE 2,345,090

MERCURY DETECTING METHOD AND APPARATUS

Porter H. Brace, Forest Hills, Pa., assignor to Westinghouse Electric & Manufacturing Company, East Pittsburgh, Pa., a corporation of Pennsylvania Application April 10, 1940, Serial No. 328,940

6 Claims. (Cl. 23—232)

This invention relates to apparatus for indicating the presence of both elemental mercury vapor and mercury compounds in the atmosphere.

The detection of mercury vapor in the atmosphere is particularly important in safeguarding the health of employees in manufacturing establishments using mercury and mercury compounds. Furthermore, leaks and losses of mercury and its compounds may be quickly discovered and stopped, if suitable means are available for detecting their presence in the air.

Free mercury vapor is not the only health hazard encountered in working with mercury. Many mercury compounds are more injurious to the employees. While air having 0.02 mg. of free mercury vapor per cubic foot will injure a worker in two or three months, a much smaller quantity of mercury compounds, particularly the mercuric salts, will be harmful in a shorter time. There is some medical authority to the effect that in the final analysis it is the mercury compounds, and not free mercury, that constitute the principal hazard to human beings.

There has been very little done to detect and indicate the existence of mercury compounds as dusts and suspensions or even sublimations in air breathed by workers. An indication of the presence of only free mercury in the air does not necessarily give a complete or true indication of the hazard to those coming into contact with mercury contaminated air.

The object of this invention is to provide for detecting both elemental mercury vapor and suspensions of mercury compounds in the atmosphere and for registering the amount of such mercury vapor and mercury compounds.

Other objects of the invention will in part be obvious and will in part appear hereinafter.

The invention accordingly comprises the features of construction, combinations of elements and arrangement of parts which will be exemplified in the construction hereinafter set forth, and the scope of the application of which will be indicated in the claims.

For a fuller understanding of the nature and objects of the invention, reference should be had to the following detailed description taken in connection with the accompanying drawings, to which:

Fig. 2 is an enlarged sectional view taken on the line II—II of Fig. 1;

Fig. 3 is a view, partly in section, of a second modification of the invention;

Fig. 4 is a sectional view of a third modification of the invention;

Fig. 5 is a sectional view of a fourth modification of the invention; and

Fig. 6 is a plan view looking at the top of Fig. 5.

Figure 1:
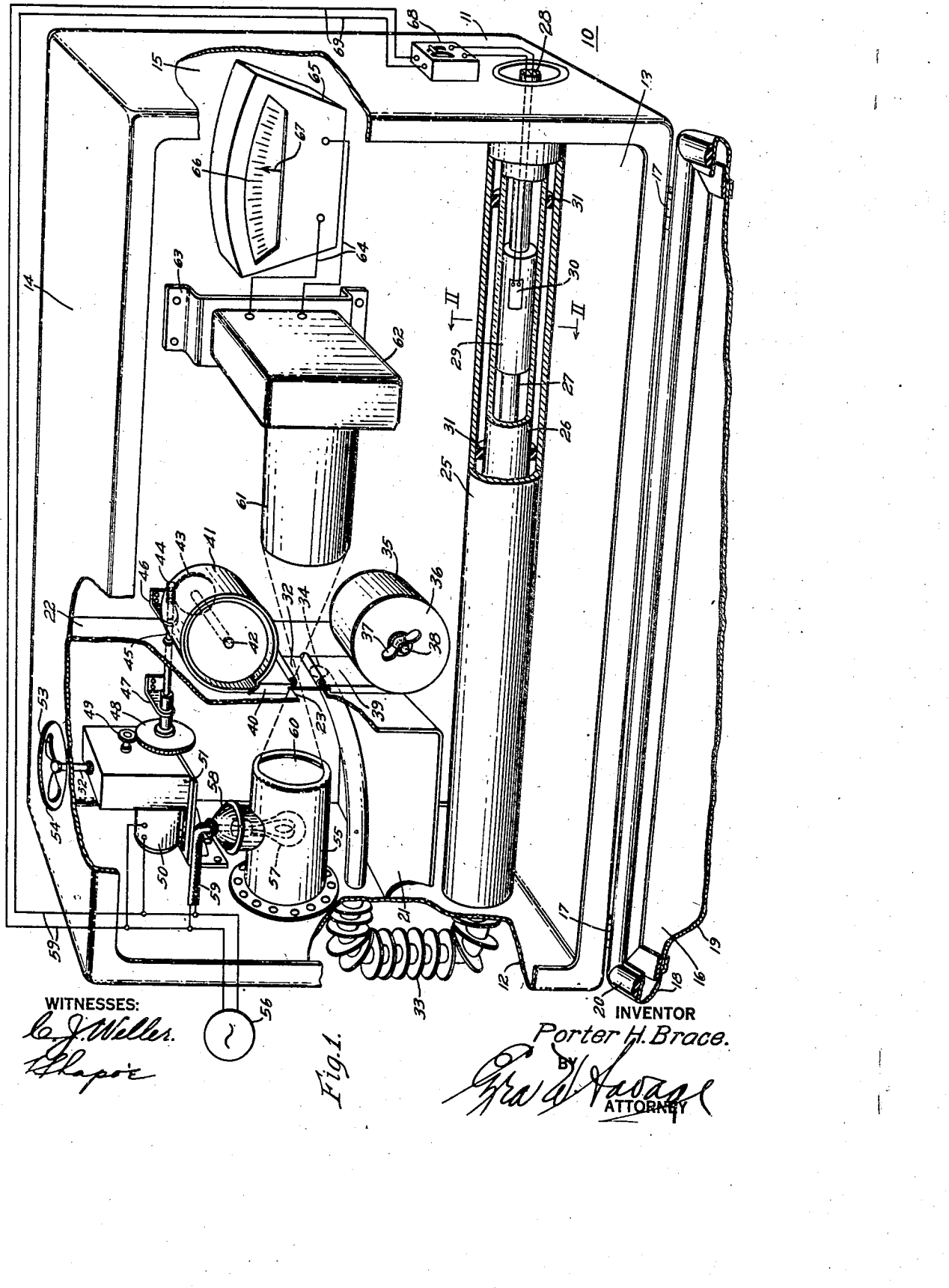
Figure 1 is a view in perspective of one form of the apparatus constructed in accordance with the invention.

In the prior art, there are several methods of detecting and indicating the presence of free mercury vapor in air. These methods will be more fully illustrated in conjunction with the several forms of my invention to be hereinafter described.

It is a purpose of my invention to detect and indicate the presence of mercury compounds, as well as free mercury vapor.

Certain mercury compounds dissociate into free mercury vapor upon heating to temperatures of about 500° C. and higher. Examples of such compounds are the mercury oxides, mercuric sulphide and mercuric chloride. Heat alone is insufficient to break down many other mercury compounds. However, it has been discovered that substantially all mercury compounds when strongly heated in the presence of lime will dissociate to free mercury almost quantitatively. My invention is predicated on the use of heat, with or without lime, in order to dissociate mercury compounds suspended in air into free mercury.

Turning to Fig. 1 of the drawings, there is illustrated in perspective an apparatus suitable for detecting and indicating both free mercury vapor and mercury compounds present in the air, either separately or as a total.

This apparatus comprises a cabinet 10 having a right side wall 11, a left side wall 12, bottom 13, top 14 and a back wall 15. A cover 16 is hinged to the cabinet along bottom 13 by means of hinges 17. The cover 16 includes an outer rim 18 retaining a glass or other transparent panel 19, whereby the interior may be observed. A gasket member 20 extends around the periphery of the cover 16 in order to seal the cabinet 10.

Th interior of the cabinet has a compartment formed at the upper left corner by a lower partition 21, and joining therewith a vertical partition 22. The vertical partition 22 has a small window or aperture 23 therein. The cover 16 is so constructed that when closed against cabinet 10, the compartment formed by walls 21, 22 and the cabinet 10 is effectively isolated from the rest of the apparatus in casing 10. Sealing means, such as rubber gaskets or the like on cover 16, may be employed for this purpose. Thereby the compartment formed by walls 21, 22 is substantially airtight, except for openings otherwise specifically provided.

A tube 25 of metal or other suitable material extends within the lower portion of cabinet 10. The tube 25 is fastened at each end in apertures in the side walls 11 and 12. The tube 25 may be welded or joined in any suitable manner. A refractory inner tube 26 is disposed in the tube 25 and spaced therefrom by insulating members 31. A small air intake member 27 extends into the refractory tube 26. The air intake member 27 has an intake opening 28 adjacent the wall 11, and near this opening it is surrounded by an electrical heating coil 29.

Within the air intake tube 27 in the zone heated by coil 29, is located a porous plug 24, shown in Fig. 2, preferably of lime, or some mineral such as calcium carbonate, which upon heating will decompose and produce lime. The porous plug 24 heats the air passing therethrough and dissociates mercury compounds, and also acts to filter out dust. An electrical thermostat 30 in coil 29 controls the heating effect thereof.

The intake member 27 extends beyond the left wall 12 of cabinet 10 to the exterior, and carries a series of cooling fin members 33 on this exterior portion. The intake tube 27 reenters the cabinet through wall 12 at a higher elevation and terminates in an exhaust port 34. This exhaust port is within the compartment formed by walls 21, 22.

Attached to the vertical wall 22 external of the compartment, but within the cabinet 10, is a carrier case 35 for holding a supply of translucent or transparent selenium sulphide strip 32. A cover 36 is retained in position on the case 35 by a wing nut 37 threaded on a post 38. A guide 39 for selenium strip 32 extends from carrier case 35 and terminates at a window adjacent window or aperture 23 in the wall 22.

A second guide 40 above the aperture 23 extends from a cylindrical receiving case 41 for receiving used selenium sulphide strip. A winding spindle 42 is rotatably mounted in the case 41. The winding spindle 42 has attached thereto a worm gear 43 which meshes with a worm 44 on a driving shaft 45 rotatably mounted in bearings 46 and 47. The end of shaft 45 remote from worm 44 has mounted thereon a gear 48 meshing with a slow-speed driving gear 49 which is part of a speed-reducing mechanism 51. The speed-reducing mechanism 51 is driven from an electric motor 50.

A second shaft 52 carrying a fan 53 extends from the speed-reducing mechanism 51. Shaft 52 is preferably driven at about motor speed, whereby fan 53 may be effective in withdrawing air from the compartment formed by walls 21, 22. An opening 54 is provided in upper wall 14 of the casing in order to accommodate the fan 53 and permit the escape of air.

Within the compartment formed by walls 21, 22, is a lamp housing 55 fastened to wall 12. Within the housing 55 is located a bulb 57 electrically connected at 58 to conductors 59. Conductors 59 are connected to a source of energy 56 which supplies energy both to motor 50 and to lamp 57. At the end of the housing 55 remote from its connection to wall 12 is a condensing lens 60 which focuses the light from lamp 57 substantially at the window 23.

On the opposite side of window 23 from the lamp housing is a photo-sensitive cell 62, mounted on bracket 63, provided with a tube 61 carrying a set of light collecting lens. Electrical impulses from photo-cell 62 are conducted by means of conductors 64 to a suitable indicating mechanism 65 carrying a pointer 67 and a scale 66.

Current from the source 56 is conducted both to the lamp and electric motor by wiring 59. Other wiring 69 conducts the current to a switch 68 which controls current flow to the heating coil 29 and thermostat 30.

The apparatus operates in the following manner: The cabinet 10 is located in the place whose atmosphere is to be tested for presence of free mercury vapor and mercury compounds. A source of current 56 is connected to the wiring 59, 69, and the heating coil 29 is brought up to a predetermined temperature. A quantity of air is drawn in at 28 of the air intake tube 27 through the zone heated by coil 29 due to the effect of fan 53. Air coming into contact with the porous plug is heated to a high temperature. Mercury in compound form will react with the lime and dissociate to release free mercury vapor. Also any soot, dust or the like will be filtered out by the porous plug. The gases travel along air intake tube 27 to the cooling portion 33 where their temperature is reduced. The mercury will remain in its elemental form after cooling. The air from intake tube 27 escapes at outlet 34 where it impinges against the selenium sulphide strip 32 at the window 23.

The effect of mercury upon the selenium sulphide strip is to cause darkening and opacity of strip 32 proportional to the quantity of mercury vapor present. The light from lamp 57, focused by lens 60 is projected upon the selenium sulphide strip 32. The amount of light traversing the strip 32 will be collected by the lens 61 and converted into current by the photo-sensitive cell 62 and transmitted to the indicating mechanism 65. The pointer 67 is adjusted to give a zero reading with undarkened or fresh sulphide strip. Any darkening of the strip of selenium sulphide will diminsh the amount of light transmitted to the photo-sensitive cell, and thereby effect a change in the reading of the indicating instrument 65.

It is preferable to place the exhaust 34 so that the escaping air acts on the selenium sulphide paper almost at the focus of the light from lamp 57. The winding mechanism 43, 44, 48, 49, etc., constitutes a considerable reduction in speed for motor 50, and the selenium sulphide strip 32 travels past window 23 at a rate of only a few inches an hour. The speed may be varied to suit conditions.

Any given portion of the strip may be exposed for any predetermined period of time, and indicates almost quantitatively the amount of mercury in the air for such predetermined period of time. Therefore, the strip 32 may be examined visually after removing from it receiver casing 41. Visual comparison with suitable standards will indicate the quantity of mercury and mercury compounds in the air.

There are several methods of operating the mechanism of Fig. 1 in order to obtain several different types of indication. If coil 29 is not operated—that is, the intake is run cold—then the apparatus records only the amount of elemental mercury vapor in the air, and does not record the presence of any mercury compounds. When operated hot, the mechanism records the total of both mercury vapor and mercury compounds. A subtraction will indicate the quantity of mercury compound present in the air. It is feasible to operate the mechanism on five or ten-minute hot and cold cycles, and thereby have a continuous determination of the respective amounts of both types of mercury.

The lime plug will make the instrument of universal utility in establishing the quantity of both free mercury and mercury in compound form in the air. As previously described, certain mercury compounds dissociate simply under heat. If the apparatus is to be used in locations known to be subject to the presence of the latter types of mercury compounds, such as the oxides or the sulphide, then any refractory porous material may be used within tube 27—for example, aluminum oxide or silicon carbide would be suitable plug materials. The same plug construction is employed in each of the other modifications of my invention, as is hereinafter described.

In place of a simple indicator, such as 65, which must be scanned by the operator from time to time to see if harmful concentrations of mercury are present in the air, it would be equally feasible to install a recorder type of mechanism. A traveling chart would replace stationary scale 66, while pointer 67 would apply ink to the moving chart.

In the modification of Fig. 3, the principle of operation is based upon the absorption of light of specific wavelengths by mercury vapor, particularly at 2537 angstroms. This is a well-known phenomenon, and has proved effective for detecting minute quantities of mercury vapor.

An air intake tube 70 admits air to a plug 72 heated by an electric coil 71. Mercury vapor present in the air is drawn into chamber 73 at the exhaust end of tube 70. The chamber 73 has a window 74 of quartz, or other suitable material, fastened by a ring 75 to tube 70. A light source emitting light of wavelengths absorbable by mercury vapor is located at 76. The type of light bulb used for this purpose should be rich in light of wavelengths of 2537 angstroms. A low mercury vapor pressure lamp is satisfactory.

The other end of the chamber 73 is closed by a quartz disc 77 secured by a ring 78 to chamber 73. A photo-sensitive cell 79 records the amount of light passing from light source 76 through the chamber 73. Conductors 80 connect the photo-sensitive cell to a suitable indicator 81, which may be of the pointer type, as shown, or a recorder.

The presence of even small quantities of mercury vapor within chamber 73 will result in a proportional absorption of considerable amounts of the light emitted by lamp 76, and thereby the indicator 81 operated from the photo-sensitive cell 79 will indicate the relative amount of mercury vapor present.

An exhaust jacket 82 encloses a fan 84 driven by motor 83 which draws gases through the apparatus. It is not necessary to cool the mercury vapor after it has passed through the heated plug 72.

In the modification of Fig. 4, the air intake tube 90 carries a porous plug 92 heated by coil 91, whereby mercury compounds may be dissociated to give free mercury vapor. Cooling fins 93 reduce the temperature of the air which has been heated at plug 92.

Attached to the exhaust end of tube 90 is a transparent sleeve 94 carrying a porous mass 95. The porous mass 95 is impregnated or carries some reagent which is chemically sensitive to the presence of free mercury vapor. Selenium sulphide is a suitable reagent. There are numerous others. A scale 96 indicates the depth of discoloration of the mineral, and the observer may examine the porous mass 95 through the transparent sleeve 94, and by comparison with the scale 96 is given an indication of how much mercury vapor is present in the air. The time necessary to produce a given zone of discoloration will indicate the concentration of the mercury in the air.

An exhaust jacket 97 within which a fan 98 is operated by the motor 99 effects movement of the air from the intake 90 and through the apparatus.

A form of apparatus requiring no motor is illustrated in Figs. 5 and 6. This apparatus depends upon its operation for thermal currents. The air intake tube 100 is located vertically. Air entering the tube is heated by the porous plug 102 and coil 101. The heated air rises readily. A small cooling fin area 103 reduces the temperature of the gases somewhat. The rising air impinges upon a horizontally placed cover member 106 spaced a small distance from the flared exhaust end 104 of the tube. The cover 106 is pivotally mounted at 105 to the flared exhaust end 104 of the tube 100.

On the underside of the cover 106, as shown in solid lines in Fig. 5, is placed a mercury vapor sensitive strip 107. This sensitive strip may consist of a coating of selenium sulphide reagent on paper. The observer may let the apparatus operate for a suitable period of time with the cover placed in operative position, and then he may tip back the cover to the dotted line position of Fig. 5 and observe the depth of staining of the selenium sulphide by any mercury vapor in the air.

For the purpoe of determination of concentrations of mercury vapor and mercury compounds in the air, a suitably graded check strip 108 prepared under controlled conditions may be placed on the strip 107, and by noting the strip portion having equal depths of the discoloration it may be quickly determined what the concentration of mercury is in the air.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim as my invention:

1. In a device for indicating the presence of elemental mercury vapor and mercury compounds in air comprising, in combination, an air intake member, means including a body of lime through which the air passes in the intake member and provided with heating means to heat the air in the presence of the lime to a temperature above about 500° C. to effect dissociation of any mercury in compound form in the air to free mercury vapor, a cooling means in association with the intake member beyond the heating means to reduce the temperature of the heated air from the air intake member, and means sensitive to the presence of mercury vapor disposed adjacent the outlet end of the intake member in position to be impinged upon by the cooled air to indicate the presence of any mercury vapor in the cooled air.

2. An apparatus for indicating the amount of elemental mercury vapor and mercury compounds present in air comprising an air intake tube having a porous plug therein composed of lime adjacent the air entry end thereof and heating means associated with the porous plug providing for heating air passing therethrough to a temperature of above about 500° C. to cause dissociation of mercury in compound form into free mercury vapor, cooling means associated with the air intake tube to cool the air beyond the porous plug, means sensitive to the presence of mercury vapors associated with the tube beyond the cooling means, including a strip of translucent material coated with a mercury vapor sensitive substance adapted to be rendered opaque in proportion to the amount of mercury vapor in air applied thereto, the tube terminating adjacent the strip and directing the air thereagainst, means for projecting a beam of light against the strip of material and a photo-sensitive cell positioned to receive the light beam from the strip to indicate the opacity of the strip of material, and means to move the strip at a predetermined rate past the terminus of the tube and means to effect flow of air through the air intake tube.

3. An apparatus for indicating the amount of elemental mercury vapor and mercury compounds present in air comprising an air intake tube having a porous plug therein adjacent the air entry end thereof and heating means associated with the porous plug providing for heating air passing therethrough to a temperature of above about 500° C. to cause dissociation of mercury in compound form into free mercury vapor, cooling means associated with the air intake tube to cool the air beyond the porous plug, and means sensitive to the presence of mercury vapors disposed adjacent the outlet end of the intake tube so that air from the cooling means impinges thereon, said sensitive means including a member carrying a mercury sensitive substance which changes its appearance in proportion to the amount of mercury vapor in the cooled air.

4. The method of detecting both free mercury vapor and mercury compounds in air which comprises passing the air through a porous refractory material at elevated temperatures so as to convert substantially all of the mercury compounds to free mercury vapor, and then determining the proportion of mercury vapor in the air.

5. The method of detecting both free mercury vapor and mercury compounds in air which comprises passing the air through a porous lime material at elevated temperatures of the order of 500° C. so as to convert substantially all of the mercury compounds to free mercury vapor, and then determining the proportion of mercury vapor in the air.

6. Apparatus for detecting both mercury vapor and mercury compounds in air which comprises a tube having an air-intake and an air-outlet, means sensitive to mercury vapor adjacent the air-outlet and positioned to be contacted with air therefrom, a refractory porous plug within the tube and adjacent to the air-intake, high temperature heating means associated with the porous plug for heating the same, and cooling means for the air between the porous plug and the means sensitive to mercury vapor.

PORTER H. BRACE.